United States Patent Office 3,279,169
Patented Oct. 18, 1966

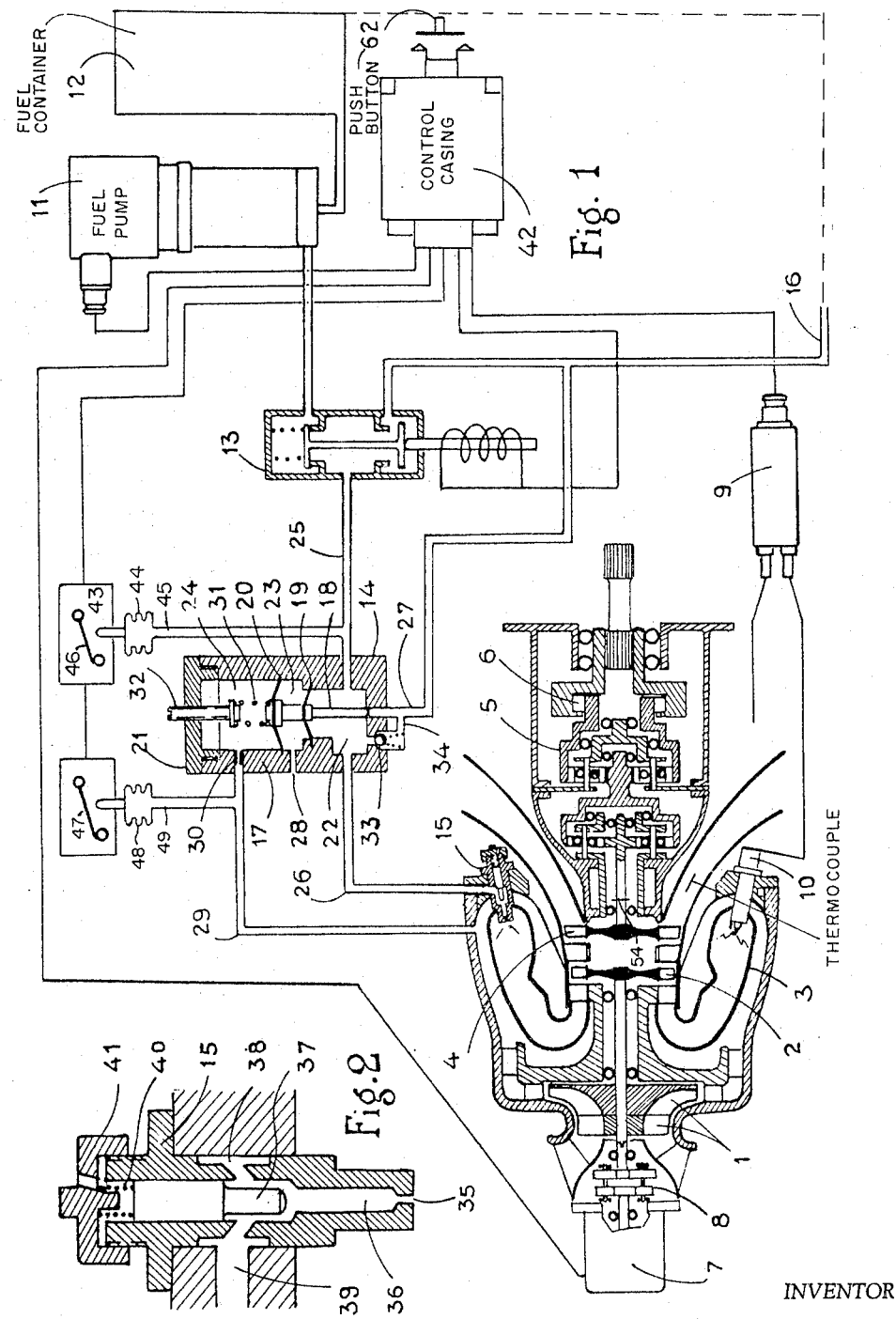

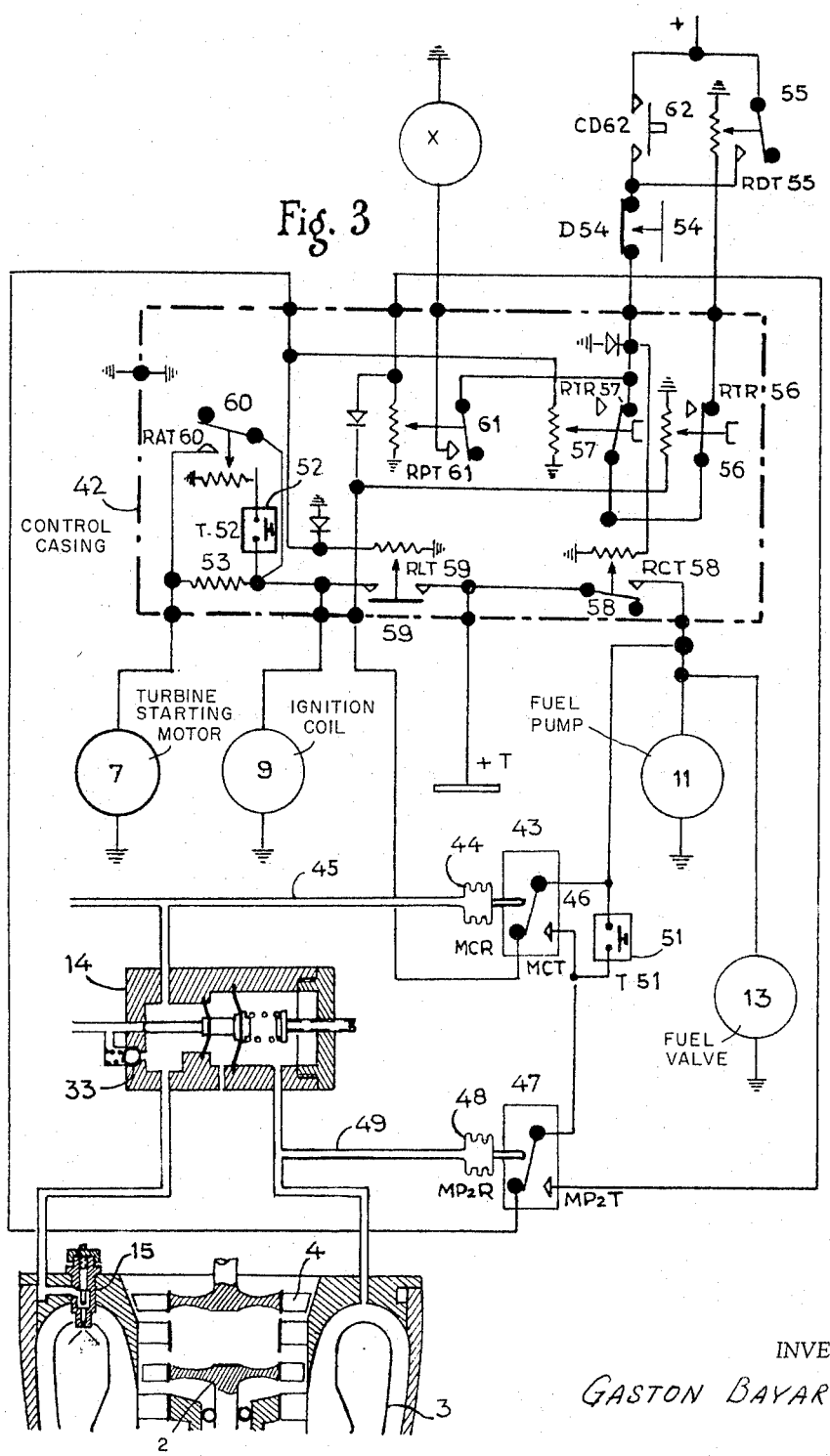

3,279,169
ARRANGEMENT FOR STARTING AND ADJUSTING THE OPERATION OF A POWER GENERATOR INCORPORATING A GAS TURBINE
Gaston Bayard, 9 Avenue de Savoie,
Toulouse, Haute-Garonne, France
Filed Jan. 29, 1964, Ser. No. 340,918
Claims priority, application France, Nov. 27, 1963,
4,929, Patent 1,388,004
5 Claims. (Cl. 60—39.14)

My invention has for its object an arrangement which allows obtaining automatically the starting and the adjustment of the operation of an auxiliary power unit incorporating a gas turbine, which serves chiefly but not exclusively for the starting of a more powerful engine. Hereinafter, the auxiliary power unit incorporating a gas turbine will be designated as A.P.U. which is the conventional abridge designation of such machine. The engine driven by the A.P.U. with a view to starting its operation will be designated hereinafter as the main engine.

In the accompanying drawings given by way of a mere exemplification:

FIG. 1 is a diagrammatic view of the whole arrangement,

FIG. 2 is an axial cross-section of the injector,

FIG. 3 is a wiring diagram of the control and adjusting system.

As illustrated in FIG. 1, the A.P.U. includes chiefly:

A gas generator including an air compressor 1 driven by a turbine 2. Between the compressor and the turbine is inserted a combustion chamber 3 inside which the injected fuel burns continuously. Said combustion has for its object to impart to the mass of compressed air a further amount of energy which is used upon expansion in the turbines arranged on the downstream side of the combustion chamber.

A receiving section including a turbine 4 inserted on the downstream side of the turbine 2 and fed by the gases passing out of the latter, said turbine 4 being coupled with the main engine through the agency of a speed reducer 5 and of a clutch of the free wheel type 6.

An electric motor 7 adapted to start the generator through the agency of a speed increasing gear 8.

An ignition circuit including a coil 9 feeding the sparking plugs 10.

A circuit feeding the fuel.

An electric circuit for the automatic control and adjustment of the starting and of the operation of the A.P.U. (FIG. 3).

The circuit feeding the fuel is constituted by an electrically controlled pump 11 sucking the fuel out of a container 12 and which feeds said fuel through an electrically-controlled valve 13 and a regulator 14 into the injectors 15 (FIG. 3) distributed inside the combustion chamber 3. The electrically-controlled valve 13 is inserted in the fuel circuit between the electrically-controlled pump 11 and the regulator 14. When inoperative, that is when the electrically-controlled valve is not fed with electric current, it closes the fuel circuit from the electrically-controlled pump and provides for a connection between the downstream fuel circuit leading to the regulator 14 and the exhaust circuit 16. In said position, the electrically-controlled valve plays in particular the part of a fire-extinguishing valve. In its operative position, that is when the electrically-controlled valve is fed with electric current, it closes the circuit returning to the exhaust and provides for a connection between the admission of the fuel into the pump and the pipe section leading towards the regulator.

The regulator 14 has for its object to adjust the pressure of the fuel fed into the injectors 15 in a manner such that it ensures a first measurement of the amount of fuel injected into the combustion chamber during the speeding up stage of the generator from a zero speed up to a speed corresponding to the recovery by the receiving section of the power required for the starting of the main engine. The injection pressure is controlled by the pressure of the gases prevailing in the combustion chamber 3 in a manner such that the ratio between the air output supplied by the compressor 1 and the output of injected fuel remains within the limits required for a proper combustion. The throughput of air is approximately proportional to the pressure of the gases prevailing in the combustion chamber 3 and the output of an injector 15 is proportional to the square root of the injection pressure. These laws governing the modifications in throughput lead in particular to making the injection pressure of the fuel rise more speedily than the pressure prevailing in the combustion chamber.

The regulator 14 is constituted by a solid body 17 provided with a stepped blind bore inside which is fitted a needle valve 18 secured to a system of two yielding diaphragms 19 and 20, the free surfaces of which have different areas. The walls of the bore, the diaphragms 19 and 20 and the plug 21 define three chambers 22, 23 and 24. The lower chamber 22 communicates with the electrically-controlled pump 11 through the pipe 25, with the injectors 15 through the pipe 26 and with the exhaust circuit 16 through the pipe 27. The output of the pipe 27 is either closed or more or less throttled by the needle valve 18. The medial chamber 23 extending between the two diaphragms communicates with the outer atmosphere through the port 28. The upper chamber 24 communicates with the combustion chamber 3 through the pipe 29; inside said latter pipe, there is fitted a capillary tube 30 which produces a lag in the transmission of the pressure inside the combustion chamber towards the chamber 24. Inside said chamber 24 is fitted a spring 31 engaging the upper end of the needle valve 18 and an adjusting screw 32 which adjusts the compressional stress.

Within the assembly which has just been described, the needle valve 18 is subjected to the action of the spring 31, on one hand, and to the resultant of the stresses transmitted by the diaphragms 19 and 20 on the other hand, and on said diaphragms there are exerted:

The pressure of the fuel on the lower surface of the diaphragm 19.

The outer atmospheric pressure on the upper surface of the diaphragm 19 and on the lower surface of the diaphragm 20.

Lastly, the pressure in the combustion chamber on the upper surface of the diaphragm 20.

The pressure of the fuel delivered by the pump 11 is adjusted by shunting toward the exhaust circuit 16 a fraction of the fuel, as provided by raising the needle valve 18 to the desired extent. During the initial stage of the starting of the generator, the pressure of the fuel which is being injected is defined merely by the stress exerted by the spring 31. When the generator is ignited and becomes operative, the pressure in the chamber 24 of the regulator increases, which leads to an increase in the fuel pressure. The capillary port 30 slows down this increase and ensures a less sudden acceleration of the generator.

The stabilized running conditions of the generator corresponding to the desired power transmitted to the receiving section is obtained by limiting the injection pressure. Said limitation is obtained by insertng in the chamber 22 a gauged valve 33 whch allows a connection between said chamber 22 and the exhaust circuit 16 through the pipe 34.

The injectors 15 are provided each with an atomizing nozzle 35 (FIG. 2) fed through the channel 36 which is closed when inoperative by the piston 37 subjected on the one hand, to the injection pressure of the fuel fed by the regulator 14 entering the chamber 38 through the port 39 and on the other hand, to the action of a spring 40 of which the compression stress is adjusted by the plug 41 provided with a port which ensures a connection between the rear side of the piston 37 and the outer atmosphere. Each injector opens for a predetermined value of the injection pressure corresponding to the adjustment of the spring 40 so as to produce an acceleration of the generator up to the speed of normal running conditions, said stepped opening of the injectors being controlled by the regulator 14.

The value of the pressure for which the ignition injectors open is lower than the value $P'oc$ given out by the regulator under the action of the spring alone.

The electric control and adjustment circuit providing for the automatic starting and operation of the A.P.U. includes an electric control casing 42 associated with:

A pressure-controlled contact-maker actuated by the pressure of the injected fuel, said pressure-controlled contacting device being shown at 43 and including elastic metal bellows 44 adapted to expand under the action of the pressure of the fuel fed by the regulator 14 with which it communicates through the pipe 45. For a selected value of said pressure which is lower than $P'oc$ and higher than the pressure at which the injectors 15 open, the bellows 44 actuates a miniature-switch 46 provided with an inoperative contact-piece MCR and an operative contact-piece MCT.

A pressure-controlled contact-maker actuated by the pressure $P'2$ prevailing in the combustion chamber of the generator, said contact-maker being shown at 47 and including elastic metal bellows 48 which expand under the action of the pressure $P'2$ generated in the combustion chamber 3 with which it is connected through the channel 49. For a selected value of said pressure corresponding to a value above that defining the autonomous operation of the generator, the bellows 48 actuate the contact-maker 47 provided with an inoperative contact-piece MP2R and an operative contact-piece MP2T.

A thermostat 51 which closes a switch T51 under the action of the heat produced by the exhaust gases passing out of the receiving section.

A thermostat 52 which closes a switch T52 under the action of the heat produced by the resistance 53 inserted in series in the feed circuit of the electric motor 7.

A speed detector 54 which opens a switch D54 when the speed of the rotor of the turbine 4 has reached a predetermined value. Said detector may be of a mechanical type, provided with a centrifugal contact-piece or else of an electronic type such as a frequency meter.

The electric control casing 42 is provided with:

A so-called starting relay 55 establishing an operative contact at RDT55 when its winding is energized.

A delayed relay 56 provided with an inoperative contact-piece RTR56 which opens when the delay has expired.

A second delayed relay 57 provided with an inoperative contact-piece RTR57 which opens when the delay has expired.

A so-called fuel-feeding relay 58 provided with an operative contact-piece RCT58 which ensures the operation of the electrically-controlled pump 11 and of the electrically-controlled valve 13 when its winding is fed.

A so-called starting relay 59 provided with an operative contact-piece RLT59 which ensures the operation of the starting motor 7 and the coil 9 when its winding is fed.

An acceleration relay 60 provided with an operative contact-piece RAT60 which short-circuits the resistance 53 when its winding is fed through the contact-piece T52 of the thermostat 52.

A so-called pilot relay 61 provided with an operative contact-piece RTP61, which feeds the electric circuit in the means starting the main engine, shown diagrammatically at X, which latter means are not to become operative until after the A.P.U. has just started.

The whole electric circuit is fed with current from an outer supply the input of which into the casing is shown at + and the return to the supply is shown by the earth symbols in order to simplify the wiring diagram.

The successive operative steps for starting the A.P.U. and controlling its operation are as follows:

When the operator depresses the starting pusher-knob 62, the switch CD62 feeds:

The winding of the relay 58 through CD62 and D54, which winding closes its contact-piece RCT58 through which the current from the positive terminal T can then energize the electrically controlled pump 11 and open the valve 13 while, on the other hand, the current flowing through said contact-piece RCT58 passes through the inoperative contact—maker 47 at MP2R so as to energize the delayed relay 56.

The winding of the starting relay 55 through CD62, D54, RTR57 and RTR56, which ensures, through the contact-piece RDT55 shunting the switch CD62, its own feed and that of the relay 58.

If, during the delay in operation of the relay 56, the pressure of the injected fuel does not rise up to the value corresponding to the release of the fuel controlled contact-maker as a consequence of a faulty operation of the electrically-controlled pump 11, of the electrically-controlled valve 13 or of the regulator 14 or else by reason of a lack of fuel in the container 12, of a hindrance or of a breaking of the pipes feeding the fuel or for any reason whatever, the release of the delayed relay 56 cuts off the feed of the starting relay 55 which in its turn, through the opening of the contact-piece RDT55 switches off the feed of the relay 58 which leads to a stoppage of the electrically-controlled pump 11 and to a closing of the electrically-controlled valve 13. In order to resume operation of the starting cycle, it is necessary for the operator to actuate again the pusher-knob 62.

The delayed relay 56 acts as a safety device during the first stage of the starting of the A.P.U. by providing for a stoppage of the cycle in the case of any failure in the arrangement.

When the pressure of the fuel reaches the required value, the contact-maker 43 controlled by the fuel pressure, closes its operative contact-piece MCT which feeds through the contact-piece MP2R of the pressure controlled circuit breaker P2:

(1) The winding of the relay 59 through RCT58, MCT and MP2R which, through its contact-piece RLT59, ensures the energization of the coil 9 and of the electric starting motor 7. The rotor of the generator is driven at a reduced speed. At the end of the time required for the release of the thermostat 52 by reason of its heating by the resistance 53, the relay 60 which is then fed, closes its contact-piece RAT60 which short-circuits the resistance 53, which leads to a speedy acceleration of the rotor of the generator under the action of the motor 7.

(2) The delayed relay 57.

At the same time, the opening of the contact-piece MCR switches off the feed of the delayed relay 56 which is thus deenergized.

If, during the time corresponding to the delay of the relay 57, the pressure $P'2$ in the combustion chamber does not reach the value required by reason either of a poor operation of the ignition means, of the starting motor or of the generator, or else for any other failure in the system and in particular those referred to hereinabove, the release of the delayed relay 57 switches off the feed of the starting relay 55 which in its turn, through the opening of the contact-piece RDT55, switches off the feed of the relay 58 which in its turn switches off the feed of the relay 59 and consequently this leads, on the one hand, to a stoppage of the electrically-controlled pump 11 and to a closing of the electrically-controlled valve 13 and, on the other hand, to a stoppage of the ignition means 9 and of the starting motor 7.

After a protracted inoperative period, the generator of the A.P.U. is cold and the fuel pipes may be empty; the first stage of starting of the A.P.U. described hereinabove, allows filling the pipes and starting the ignition means so as to ensure the proper conditions for starting during the second stage which has also been described hereinabove.

The passage between the first stage and the second stage is normally produced by the release of the contact-maker controlled by the fuel pressure 43.

When the generator of the A.P.U. is hot as a consequence of a preceding starting and with a view to preventing large flames from escaping out of the receiving section, it is necessary to cut out the first starting stage.

During the preceding operation of the A.P.U., the thermostat 51 has established an operative contact at T51 and it retains said contact closed during a time which is a function of its thermal inertia, which contact shunts the operative contact-piece MCT of the contact-maker 43 controlled by the fuel pressure, which leads to the satisfaction of the electric conditions for the starting of the A.P.U. directly as provided by its second stage at the moment at which the operator acts on the pusher-knob 62.

When the pressure in the combustion chamber 3 has reached the value required and which defines the proper ignition of the generator, the contact-maker P2 47 controlled by pressure closes its operative contact-piece MP2T which, through the contact-pieces RCT58 and MCT or T51 feeds:

The winding of the relay 61 which, through its contact-piece RPT61, ensures the electric feed for the sequential steps starting the main engine.

The delayed relay 56.

Simultaneously, the opening of the contact-piece MP2R switches off the feed:

Of the delayed relay 57 which is thus deenergized.

Of the relay 59 which leads to a stoppage of the driving motor 7 and of the ignition means 9.

During this third stage, the machine increases its speed at a high rate until it reaches its normal operative speed under the associated action of the regulator 14 and of the successive openings of the injectors 15, which allows increasing the output of fuel injected into the combustion chamber 3 gradually as the pressure of gases in said chamber increases up to the value selected and adjusted by the gauged ball valve 33 limiting the injection pressure which controls at the end of the acceleration period the output of injected fuel.

The duration of said third stage is limited to the delay provided by the relay 56 energized from the positive terminal T through RCT58, MCT46, MP2T and the rectifier R; said relay 56 opens its contact-piece RTR56, so as to switch off the feed of the starting relay 55. This delay period is defined by the time required for driving the main engine as required for its accurate starting.

During said third stage, the main engine is driven by the receiving section of the A.P.U. and its speed increases while the speed of the turbine 4 increases proportionally. When the speed of the turbine 4 has reached a predetermined value, the speed detector 54 opens its contact-piece D54 and switches off the feed of the starting relay 55 and also that of the relay 58 which leads to a stoppage of the operation of the A.P.U.

The mechanical disconnection between the receiving section of the A.P.U. and of the main engine is obtained automatically through the agency of the free wheel clutch.

What I claim is:

1. In combination with an auxiliary power unit adapted to start a main engine and including gas turbine means, a compressor driven by the latter, a combustion chamber fed by the compressor and feeding said gas turbine means and an electric motor for starting the turbine rotating, the provision of a control system comprising an electrically driven fuel pump, a pipe feeding fuel out of said pump into said combustion chamber, a regulator in said pipe, subjected to the pressure of fluid in the combustion chamber and operative to make the fuel pressure fed into the combustion chamber rise more speedily than the pressure inside the combustion chamber, a first and a second pressure-controlled contact-maker subjected respectively to the pressure of fuel in the regulator and to the pressure of fluid in the combustion chamber, hand-operable means energizing said electrically driven fuel pump, means whereby the first contact-maker when subjected to a predetermined fuel pressure upon operation of the fuel pump energizes the turbine driving motor, and means whereby the second contact-maker when subjected to a predetermined pressure upon operation of said turbine-driving motor starts operation of the main engine and switches off the energization of the turbine-driving motor.

2. In the control system claimed in claim 1, the provision of a delayed relay energized by the operation of the hand-operable means, de-energized by the second contact-maker and operable, when the pressure has not risen in the combustion chamber to operate the latter after its delay period has expired, to stop the operation of the turbine-driving motor.

3. In the control system claimed in claim 1, the provision of a delayed relay energized by the operation of the first contact-maker and operable, after its delay period has expired, to disconnect the pump from its electric supply.

4. In a control system as claimed in claim 1, the provision of a circuit feeding the turbine-driving motor, a resistance in said circuit, a thermostat subjected to the heat produced by said resistance and means controlled by the thermostat and short-circuiting said resistance for a predetermined temperature of the latter, thereby to accelerate the turbine-driving motor.

5. In a control system as claimed in claim 1, the provision of a thermostat subjected to the action of the heat of exhaust gases of the main engine and means controlled by said thermostat and operative to shunt the first contact-maker to allow energization of the turbine driving motor upon operation of the hand-operable means after last-mentioned motor has been stopped and before the exhaust gases of the main engine have ceased heating said thermostat.

References Cited by the Examiner

UNITED STATES PATENTS

| | | | |
|---|---|---|---|
| 2,715,313 | 8/1955 | Fleming et al. | 60—39.14 |
| 2,808,702 | 10/1957 | Dotson | 60—39.14 X |
| 2,851,859 | 9/1958 | Foure | 60—39.14 X |
| 2,938,338 | 5/1960 | Cheswick et al. | 60—39.14 |
| 2,962,597 | 11/1960 | Evans | 60—39.14 X |
| 3,151,452 | 10/1964 | Bunger et al. | 60—39.14 |
| 3,197,958 | 8/1965 | Davies | 60—39.28 XR |

JULIUS E. WEST, *Primary Examiner.*